US008858668B2

(12) United States Patent
Felber et al.

(10) Patent No.: US 8,858,668 B2
(45) Date of Patent: Oct. 14, 2014

(54) WEDGE-SHAPED FILTER ELEMENT WITH TWO LEAF FILTERS

(75) Inventors: Uwe Felber, Absteniach (DE); Ulrich Stahl, Laudenbach (DE); Claudio Marin, Heidelberg (DE)

(73) Assignee: Carl Freudenberg KG, Weinheim (DE)

( * ) Notice: Subject to any disclaimer, the term of this patent is extended or adjusted under 35 U.S.C. 154(b) by 220 days.

(21) Appl. No.: 13/345,852

(22) Filed: Jan. 9, 2012

(65) Prior Publication Data

US 2012/0174788 A1     Jul. 12, 2012

(30) Foreign Application Priority Data

Jan. 11, 2011   (DE) .......................... 10 2011 008 325

(51) Int. Cl.
  *B01D 46/00*   (2006.01)
  *B01D 46/42*   (2006.01)
  *B01D 46/52*   (2006.01)
  *B01D 46/24*   (2006.01)

(52) U.S. Cl.
  CPC ............ *B01D 46/2411* (2013.01); *B01D 46/42* (2013.01); *B01D 2265/026* (2013.01); *B01D 46/521* (2013.01)
  USPC .................... 55/483; 55/484; 55/497; 55/502

(58) Field of Classification Search
  CPC ...... F02C 7/05; B01D 46/001; B01D 46/002; B01D 46/0008; B01D 46/0009; B01D 46/125; B60H 3/06
  USPC ........ 55/385.3, 482, 483, 484, 498, 502, 521; 95/286
  See application file for complete search history.

(56) References Cited

U.S. PATENT DOCUMENTS

| | | | | |
|---|---|---|---|---|
| 2,966,959 | A * | 1/1961 | Neumann | 55/484 |
| 3,691,736 | A * | 9/1972 | Neumann | 55/484 |
| 3,830,042 | A * | 8/1974 | MacDonnell | 55/341.4 |
| 5,531,892 | A * | 7/1996 | Duffy | 210/493.1 |
| 6,099,608 | A * | 8/2000 | Harms et al. | 55/400 |
| 6,454,834 | B1 * | 9/2002 | Livingstone et al. | 95/11 |
| 6,676,721 | B1 * | 1/2004 | Gillingham et al. | 55/302 |
| 6,977,006 | B2 * | 12/2005 | Reid | 55/495 |
| 7,074,250 | B1 * | 7/2006 | Chipner et al. | 55/472 |
| 7,338,544 | B2 * | 3/2008 | Sporre et al. | 55/302 |
| 7,850,756 | B1 * | 12/2010 | Senetar, III | 55/503 |
| 7,967,898 | B2 * | 6/2011 | Sporre et al. | 95/280 |
| 7,972,401 | B2 * | 7/2011 | Stock et al. | 55/483 |
| 8,157,883 | B2 | 4/2012 | Felber et al. | |

(Continued)

FOREIGN PATENT DOCUMENTS

| | | |
|---|---|---|
| DE | 69605205 T2 | 5/2000 |
| DE | 19960175 A1 | 9/2001 |

(Continued)

*Primary Examiner* — Duane Smith
*Assistant Examiner* — Britanny Precht
(74) *Attorney, Agent, or Firm* — Leydig, Voit & Mayer, Ltd.

(57) ABSTRACT

A filter element includes a holding frame with an intake opening, an air intake disposed on the intake opening, and an anti-twist mechanism configured such that the filter element is only insertable into a filter housing in one position. The anti-twist mechanism includes a body with two asymmetrically configured recesses extending along a longitudinal axis of the holding frame. The filter element also includes two bellows disposed on the holding frame, the bellows and holding frame delimiting a cavity.

9 Claims, 3 Drawing Sheets

(56) References Cited

U.S. PATENT DOCUMENTS

| | | |
|---|---|---|
| 2002/0046556 A1* | 4/2002 | Reid .................. 55/484 |
| 2003/0051453 A1* | 3/2003 | Moreau et al. ........... 55/385.3 |
| 2004/0035097 A1* | 2/2004 | Schlensker et al. ........ 55/498 |
| 2004/0134171 A1* | 7/2004 | Scott et al. ............. 55/482 |
| 2004/0144254 A1* | 7/2004 | Wiser et al. ............. 96/66 |
| 2004/0187689 A1* | 9/2004 | Sporre et al. ............ 95/280 |
| 2005/0193695 A1* | 9/2005 | Holmes et al. ........... 55/482 |
| 2007/0169448 A1* | 7/2007 | Osborne et al. .......... 55/484 |
| 2007/0199449 A1* | 8/2007 | Wiser et al. ............. 96/69 |
| 2008/0010958 A1* | 1/2008 | Fester et al. ............ 55/472 |
| 2008/0066434 A1* | 3/2008 | Kuempel et al. .......... 55/357 |
| 2008/0314248 A1* | 12/2008 | Peteln ................. 96/1 |
| 2009/0071111 A1* | 3/2009 | Lundgren et al. ......... 55/385.4 |
| 2009/0094951 A1 | 4/2009 | Baseotto et al. |
| 2009/0188218 A1* | 7/2009 | Pippel et al. ............ 55/383 |
| 2010/0146919 A1* | 6/2010 | Nelson et al. ........... 55/483 |
| 2010/0307118 A1* | 12/2010 | Kawano et al. .......... 55/483 |
| 2011/0061352 A1* | 3/2011 | Stahl et al. ............. 55/385.3 |
| 2011/0113736 A1* | 5/2011 | Raether et al. .......... 55/302 |

FOREIGN PATENT DOCUMENTS

| | | |
|---|---|---|
| DE | 202006005012 U1 | 8/2007 |
| DE | 102008062956 A1 | 6/2010 |
| FR | 2231409 A1 | 12/1974 |
| JP | 2000176221 A | 6/2000 |
| KR | 1020090132545 A | 3/2012 |
| WO | WO 0143851 A2 | 6/2001 |
| WO | WO 2007054168 A1 | 5/2007 |
| WO | WO 2009014982 A1 | 1/2009 |

\* cited by examiner

WEDGE-SHAPED FILTER ELEMENT WITH TWO LEAF FILTERS

CROSS REFERENCE TO RELATED APPLICATIONS

This application claims priority to German Patent Application No. 10 2011 008 325.1, filed Jan. 11, 2011, which is incorporated by reference herein in its entirety.

FIELD

The invention relates to a filter element with a holding frame.

BACKGROUND

Filter elements can be configured in such a way that that they only fit into a matching filter housing. In particular, some filter elements are equipped with mechanical means. The mechanical means ensure that a filter element is positioned correctly. Particularly in the case of filter elements that are essentially symmetrically structured, however, the risk exists that the filter elements might not be inserted into the filter housing correctly.

SUMMARY

In an embodiment, the present invention provides a filter element including a holding frame with an intake opening, an air intake disposed on the intake opening, and an anti-twist mechanism configured such that the filter element is only insertable into a filter housing in one position. The anti-twist mechanism includes a body with two asymmetrically configured recesses extending along a longitudinal axis of the holding frame. The filter element also includes two bellows disposed on the holding frame, the bellows and holding frame delimiting a cavity.

BRIEF DESCRIPTION OF THE DRAWINGS

Exemplary embodiments of the present invention are described in more detail below with reference to the drawings, in which.

DETAILED DESCRIPTION

Figure 1:
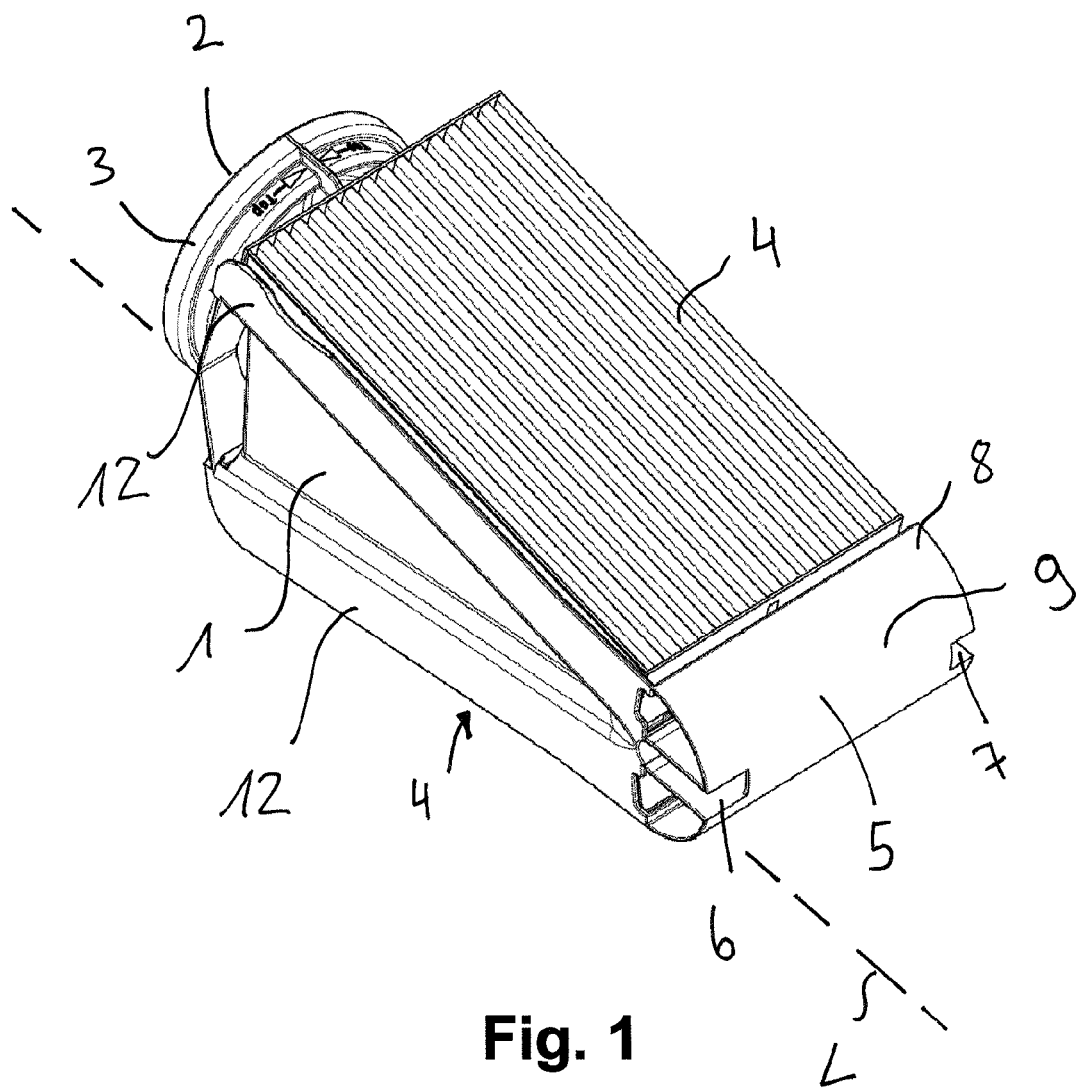
FIG. 1 is a perspective view of a wedge-shaped filter element having two leaf filters and one anti-twist mechanism.

In an embodiment, the present invention provides a filter element that, despite its essentially symmetrical structure, can be positioned correctly by mechanical means in a filter housing.

First of all, it has been recognized according to embodiments of the invention that a filter element comprising a holding frame with an intake opening on which an air intake is arranged—whereby two bellows are arranged on the holding frame and whereby the bellows, together with holding frame, delimit a cavity—has a structure that is essentially symmetrical to its longitudinal axis and consequently might be incorrectly inserted into an air-intake system. Secondly, it has been recognized that this problem can be solved in an ingenious manner by means of an anti-twist mechanism. According to an embodiment of the invention, the holding frame has an anti-twist mechanism that ensures that the filter element can only be inserted into a filter housing in one position. The anti-twist mechanism is configured as a body that has two asymmetrically configured recesses that run along a longitudinal axis of the holding frame. As a result, the filter element can be moved or slid parallel to its longitudinal axis while engagement elements of a filter housing engage with the recesses in this process. Consequently, a filter element is put forward that, despite its essentially symmetrical structure, can be positioned correctly by mechanical means.

Consequently, a filter element that can be positioned correctly by mechanical means in a filter housing is achieved.

Thanks to the anti-twist mechanism, the filter element could be affixed in a filter housing so that it can be latched in place. Engagement elements in the filter housing can interact with the anti-twist mechanism in order to affix the filter element so that it can be latched in place. As a result, the anti-twist mechanism and the fixation means are configured as a single part.

The anti-twist mechanism could be configured at the end of the holding frame that faces away from the intake opening. As a result, the connection of the air intake with additional elements of the air-intake system is not detrimentally affected by the anti-twist mechanism.

The anti-twist mechanism could be configured as a semi-cylinder whose outer surface is interrupted by the recesses. Due to its round shape, a semi-cylinder allows the filter element to be easily swiveled within a confined installation space. The filter element can be made to engage with the above-mentioned engagement elements in such a way that it can be swiveled as well as slid.

The holding frame could form two holding planes for the bellows, whereby spacers for the folds of the bellows can project from the holding planes. This prevents the bellows from becoming deformed and prevents the folds from adhering to each other when air is being drawn in. The folds are stabilized.

The spacers could engage with the folds of the bellows by intermeshing with fence-like webs. This stabilizes the bellows along their entire width or length.

The holding frame could form two holding planes for the bellows, whereby the holding planes are flanked by guiding flanks. As a result, the bellows that are on the holding frame can be placed against the guiding flanks The guiding flanks can protect the bellows from being damaged from the sides. Furthermore, the guiding flanks can clamp and affix the bellows on the holding frame. In particular, it is conceivable to glue the bellows to the guiding flanks. Preferably, the bellows can be fused together with the guiding flanks. This saves adhesive.

The holding frame could be configured so as to be wedge-shaped, whereby two holding planes for the bellows are oriented obliquely with respect to each other. This allows the holding frame to be easily inserted into a tapered filter housing.

The bellows could also be configured as leaf filters having a filter means folded in a zigzag pattern. Leaf filters are commercially available and can be readily combined with the holding frame.

The filter element described here is particularly well-suited for use in the air filtration systems of motor vehicles.

There are various possibilities for configuring and refining the teaching of the present invention in an advantageous manner. For this purpose, reference is hereby made, on the one hand, to the subordinate claims and, on the other hand, to the explanation below of a preferred embodiment of the invention on the basis of the drawing.

FIG. 1 shows a filter element comprising a holding frame 1 with an intake opening 2 on which an air intake 3 is arranged, whereby two bellows 4 are arranged on the holding frame 1, whereby, together with the holding frame 1, the bellows 4 delimit a cavity, and whereby the holding frame 1 has an anti-twist mechanism 5 that ensures that the filter element can only be inserted into a filter housing in one position.

The holding frame 1, along with the anti-twist mechanism 5, is made of a plastic on the basis of polypropylene.

The anti-twist mechanism 5 is configured at the end of the holding frame 1 that faces away from the intake opening 2.

The anti-twist mechanism 5 is configured according to the invention as a body that has two asymmetrically configured recesses 6, 7 that run along a longitudinal axis L of the holding frame 1. A first recess 6 is configured so as to be deeper orthogonally to the longitudinal axis L than the second recess 7. The recesses 6 and 7 are opposite from each other at the same height but they protrude into the holding frame 1 to different depths in the orthogonal direction relative to the longitudinal axis L.

The anti-twist mechanism 5 is configured as a semi-cylinder 8 whose outer surface 9 is interrupted by the recesses 6, 7.

Figure 2:
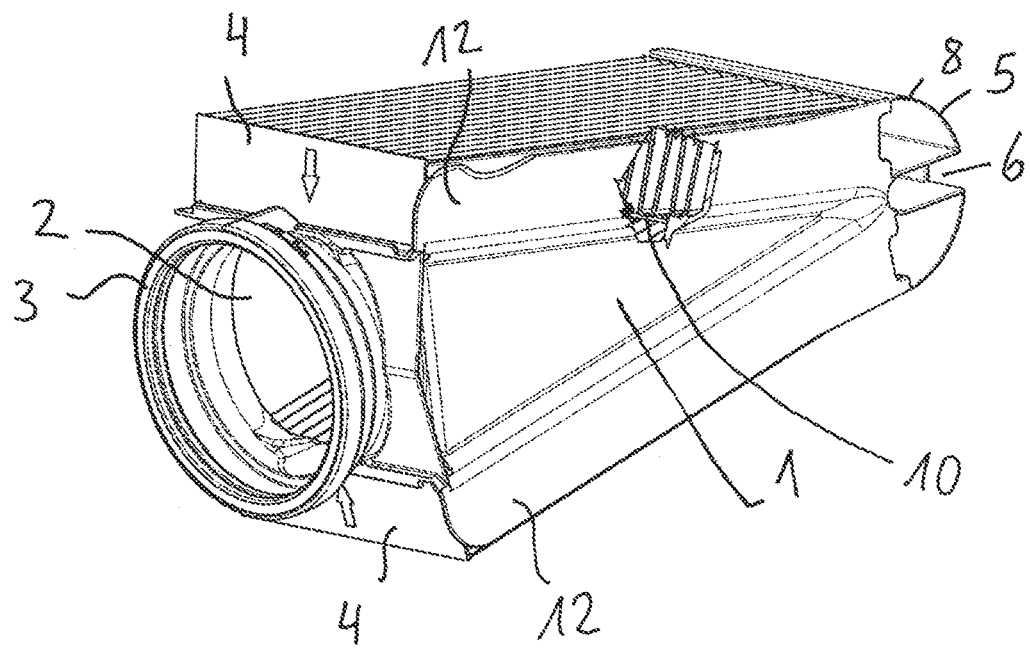
FIG. 2 is a partially cut-away, perspective view of a wedge-shaped filter element having two flat filters and one anti-twist mechanism.

FIG. 2 shows that the holding frame 1 forms two holding planes 10 for the bellows 4. The holding frame 1 forms two holding planes 10 for the bellows 4, whereby the holding planes 10 are flanked by guiding flanks 12. The guiding flanks 12 are only configured on one side of the holding frame 1.

Figure 3:
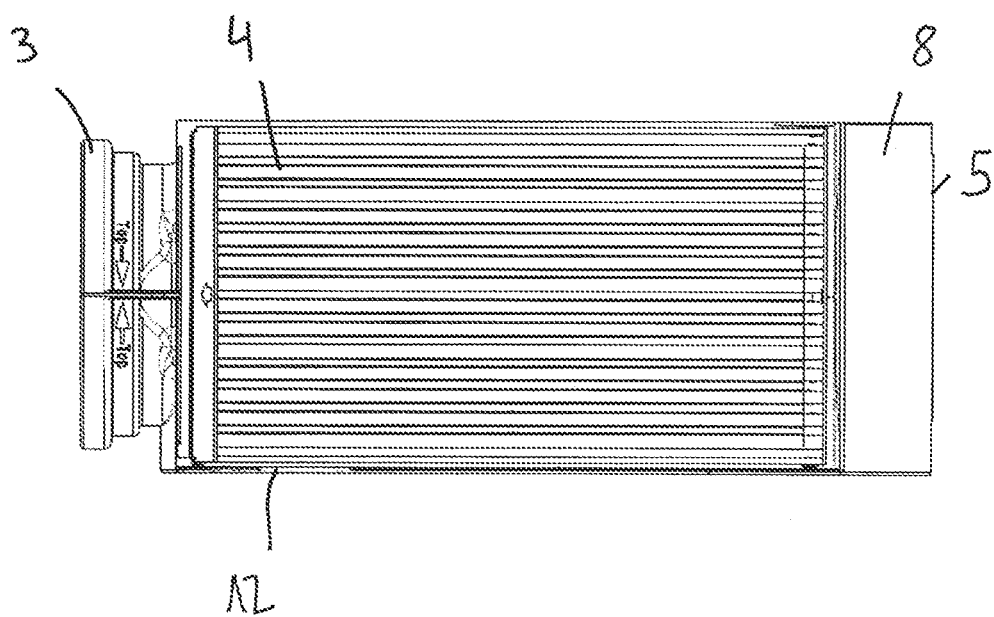
FIG. 3 is a top view of a leaf filter of the filter element according to FIG. 1.

FIG. 3 shows a top view of an inflow surface of a bellows 4 of the filter element.

Figure 4:
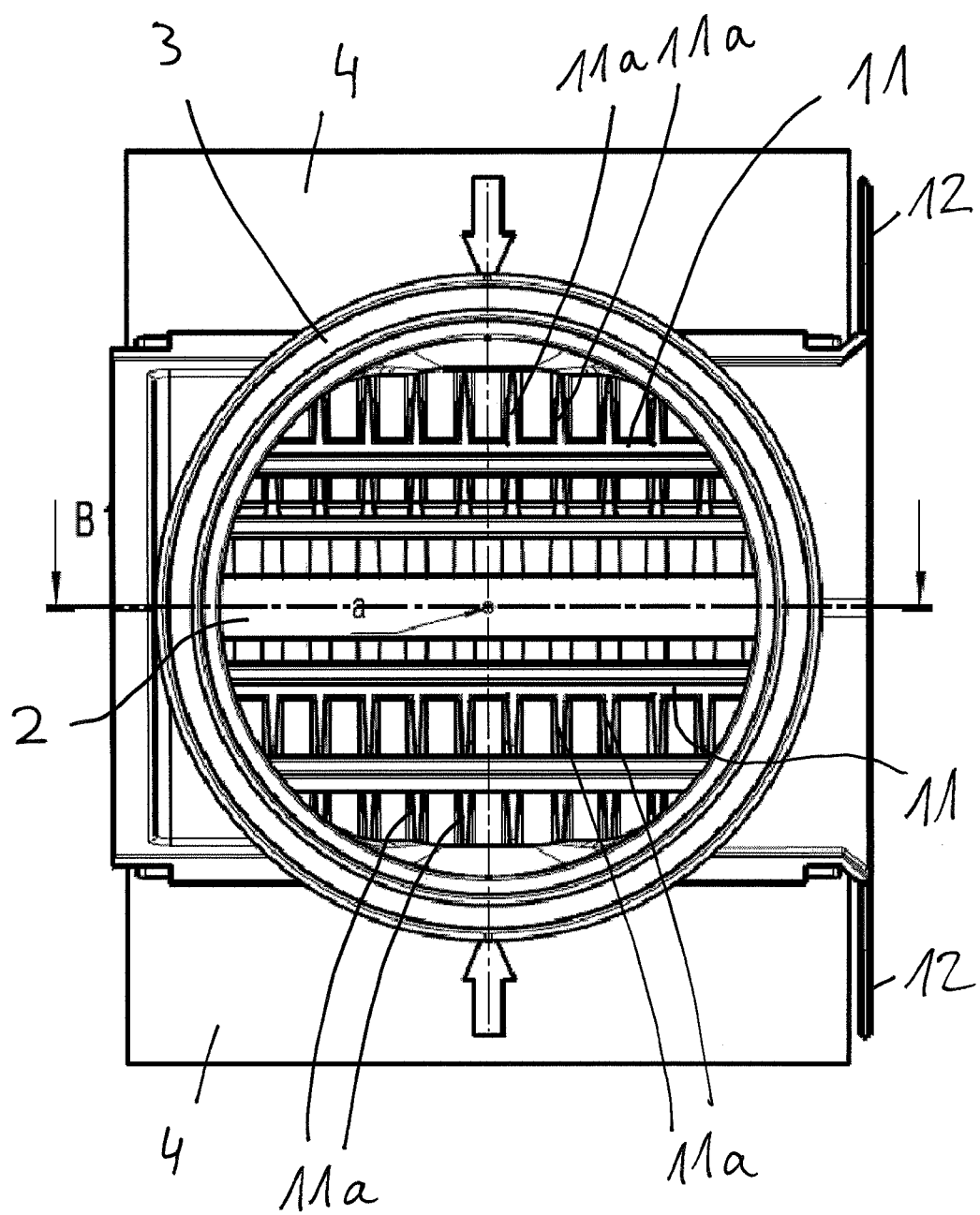
FIG. 4 is a view in the direction of the longitudinal axis of the filter element according to FIG. 1, whereby the cavity can be seen through the intake opening.

In a view through the intake opening 2 into the cavity, FIG. 4 shows that spacers 11 for the folds of the bellows 4 protrude from the holding planes 10. The spacers 11 engage with the folds of the bellows 4 by intermeshing with fence-like webs 11a. This stabilizes the bellows.

The bellows 4 are configured as leaf filters having a nonwoven filter means folded in a zigzag pattern. The bellows 4 are configured as rectangular leaf filters.

FIGS. 1 and 2 show that the holding frame 1 is configured so as to be wedge-shaped, whereby two holding planes 10 for the bellows 4 are oriented obliquely with respect to each other. The bellows 4 are across from each other and are oriented obliquely with respect to each other corresponding to the wedge shape of the holding frame 1. The holding frame 1 tapers towards the anti-twist mechanism 5.

The recesses 6, 7 are configured with elongated slits of different depths which can engage with engagement elements (not shown here) in the filter housing.

In the filter housing, air is drawn in via the air intakes 3, a process in which air is drawn in from the outside through the bellows 4 into the cavity. The filtered air leaves the cavity through the air intake 3 and is then conveyed in the air-intake system of a motor vehicle.

Regarding advantageous embodiments and refinements of the teaching according to the invention, reference is hereby made, on the one hand, to the general part of the description and/or, on the other hand, to the patent claims.

In conclusion, special mention should be made of the fact that the above-mentioned embodiment serves only to elucidate the teaching according to the invention but it does not restrict the teaching exclusively to this embodiment.

What is claimed is:

1. A filter element comprising:
a holding frame including an intake opening, an air intake disposed on the intake opening, and an anti-twist mechanism configured such that the filter element is only insertable into a filter housing in one position, the anti-twist mechanism including a body with two asymmetrically configured recesses extending along a longitudinal axis of the holding frame; and
two bellows disposed on the holding frame, the bellows and holding frame delimiting a cavity.

2. The filter element recited in claim 1, wherein the filter element is latchable in place in the filter housing due to the configuration of the anti-twist mechanism.

3. The filter element recited in claim 1, wherein the anti-twist mechanism is disposed at an end of the holding frame that faces away from the intake opening.

4. The filter element recited in claim 1, wherein the anti-twist mechanism includes a semi-cylinder with an outer surface that is interrupted by the asymmetrically configured recesses.

5. The filter element recited in claim 1, wherein the holding frame includes two holding planes accommodating the bellows, and wherein spacers corresponding to folds of the bellows project from the holding planes.

6. The filter element recited in claim 5, wherein the spacers include fence-like webs, and engage with the respective folds of the bellows by intermeshing with the fence-like webs.

7. The filter element recited in claim 1, wherein the holding frame includes two holding planes corresponding to the bellows, the holding planes being flanked by guiding flanks.

8. The filter element recited in claim 1, wherein the holding frame is wedge-shaped and includes two holding planes corresponding to the bellows that are disposed obliquely with respect to each other.

9. The filter element recited in claim 1, wherein each of the bellows is a leaf filter and includes a filter element folded in a zigzag pattern.

* * * * *